US009193260B2

(12) United States Patent
Sotiriades et al.

(10) Patent No.: US 9,193,260 B2
(45) Date of Patent: Nov. 24, 2015

(54) CLOSURE DEVICE FOR CONTROLLING EVAPORATIVE EMISSIONS FROM A FUEL TANK

(75) Inventors: Aleko D. Sotiriades, Cedarburg, WI (US); Troy Timothy Fredrick Becker, Manitowoc, WI (US)

(73) Assignee: KOHLER CO.

( * ) Notice: Subject to any disclaimer, the term of this patent is extended or adjusted under 35 U.S.C. 154(b) by 302 days.

(21) Appl. No.: 13/277,738

(22) Filed: Oct. 20, 2011

(65) Prior Publication Data
US 2012/0097675 A1    Apr. 26, 2012

Related U.S. Application Data

(60) Provisional application No. 61/405,505, filed on Oct. 21, 2010.

(51) Int. Cl.
*B60K 15/035*    (2006.01)
*B60K 15/04*    (2006.01)

(52) U.S. Cl.
CPC ....... *B60K 15/03504* (2013.01); *B60K 15/0406* (2013.01); *B60K 2015/03514* (2013.01); *B60K 2015/03547* (2013.01)

(58) Field of Classification Search
CPC .................. B60K 15/0406; B60K 2015/03547
USPC ........ 220/203.01, 203.29, 373, 374, DIG. 33, 220/202, 371
See application file for complete search history.

(56) References Cited

U.S. PATENT DOCUMENTS

| 1,047,517 | A | * | 12/1912 | Harris | 220/203.08 |
|---|---|---|---|---|---|
| 1,350,109 | A | * | 8/1920 | Nystrom | 220/373 |
| 1,499,461 | A | * | 7/1924 | Kruppa | 220/374 |
| 1,717,573 | A | * | 6/1929 | McAttee | 220/373 |
| 1,821,860 | A | * | 9/1931 | Werner et al. | 55/300 |
| 1,841,691 | A | * | 1/1932 | Wilson | 220/371 |
| 2,159,178 | A | * | 5/1939 | Rike et al. | 220/326 |

(Continued)

FOREIGN PATENT DOCUMENTS

| CN | 101203441 | 6/2006 |
|---|---|---|
| CN | 101203441 | 6/2008 |

(Continued)

OTHER PUBLICATIONS

Corresponding Chinese Office Action dated Nov. 5, 2013.
(Continued)

*Primary Examiner* — Fenn Mathew
*Assistant Examiner* — Christopher McKinley
(74) *Attorney, Agent, or Firm* — The Belles Group, P.C.

(57) ABSTRACT

A closure device, such as a fuel cap, for controlling evaporative emissions from a fuel tank. In one aspect, the invention comprises: a housing defining an internal chamber containing a hydrocarbon adsorbing media; a fuel vapor diffuser extending from a floor of the internal chamber and into the internal chamber, the fuel vapor diffuser comprising: (1) an inlet passageway extending from a fuel vapor inlet port to a plenum in a top portion of the fuel vapor diffuser; and (2) a downcomer passageway extending from the plenum to at least one aperture located at a bottom portion of the fuel vapor diffuser, the at least one aperture forming a passageway between the downcomer passageway and the internal chamber; and at least one outlet passageway extending from the internal chamber to an atmospheric air outlet port.

17 Claims, 4 Drawing Sheets

(56) References Cited

U.S. PATENT DOCUMENTS

| | | | |
|---|---|---|---|
| 2,298,938 A * | 10/1942 | Griffin, Jr. et al. | 220/373 |
| 2,675,093 A | 4/1954 | McCall et al. | |
| 2,675,886 A | 4/1954 | McMullen | |
| 2,762,852 A | 9/1959 | Litton | |
| 3,016,345 A * | 1/1962 | Price | 208/187 |
| 3,140,794 A | 7/1964 | Arndt et al. | |
| 3,286,873 A * | 11/1966 | Tuckey | 220/374 |
| 3,385,467 A * | 5/1968 | Lindenberg | 220/374 |
| 3,815,776 A * | 6/1974 | MacMillan | 220/203.24 |
| 3,825,147 A * | 7/1974 | Noponen et al. | 220/203.24 |
| 3,854,911 A | 12/1974 | Walker | |
| 3,861,557 A | 1/1975 | Tupper | |
| 3,961,724 A * | 6/1976 | Kapsy | 220/371 |
| 4,028,075 A | 6/1977 | Roberge | |
| 4,136,796 A * | 1/1979 | Dubois et al. | 220/259.4 |
| 4,165,816 A | 8/1979 | Tupper | |
| 4,173,207 A | 11/1979 | Hiramatsu | |
| 4,271,977 A * | 6/1981 | Saigne | 220/371 |
| 4,285,440 A | 8/1981 | Adams | |
| 4,381,929 A | 5/1983 | Mizuno et al. | |
| 4,512,499 A * | 4/1985 | Uuskallio | 220/374 |
| 4,646,701 A | 3/1987 | Fukumoto | |
| 4,694,870 A | 9/1987 | Vize | |
| 4,696,409 A * | 9/1987 | Vize | 220/203.2 |
| 4,813,453 A | 3/1989 | Jenkins et al. | |
| 4,816,045 A | 3/1989 | Szlaga et al. | |
| 4,852,761 A | 8/1989 | Turner et al. | |
| 4,867,770 A | 9/1989 | Feeney | |
| 4,884,716 A * | 12/1989 | Steiner | 220/202 |
| 4,971,219 A | 11/1990 | Dombeck et al. | |
| 5,042,678 A | 8/1991 | Munguia | |
| 5,119,791 A | 6/1992 | Gifford et al. | |
| 5,149,335 A * | 9/1992 | Kellenberger et al. | 604/372 |
| 5,151,194 A * | 9/1992 | Simpson et al. | 210/680 |
| 5,152,419 A * | 10/1992 | Yanagi | 220/374 |
| 5,259,412 A | 11/1993 | Scott et al. | |
| 5,279,439 A * | 1/1994 | Kasugai et al. | 220/203.23 |
| 5,375,633 A | 12/1994 | Bucci | |
| 5,395,004 A | 3/1995 | Griffin et al. | |
| 5,453,118 A | 9/1995 | Heiligman | |
| 5,558,244 A * | 9/1996 | Akaike et al. | 220/374 |
| 5,649,859 A * | 7/1997 | Shiga | 454/275 |
| 6,260,544 B1 * | 7/2001 | Spry et al. | 123/516 |
| 6,681,789 B1 * | 1/2004 | Moulis et al. | 137/14 |
| 6,708,713 B1 | 3/2004 | Gericke | |
| 6,959,696 B2 | 11/2005 | Shears et al. | |
| 7,261,093 B2 | 8/2007 | Groom et al. | |
| 7,267,112 B2 | 9/2007 | Donahue et al. | |
| 7,320,314 B2 * | 1/2008 | Kashima et al. | 123/519 |
| 7,350,511 B1 | 4/2008 | Roche et al. | |
| 7,677,277 B2 * | 3/2010 | Thompson et al. | 141/350 |
| 7,703,629 B2 * | 4/2010 | Nelson | 220/371 |
| 7,874,764 B2 * | 1/2011 | Fossen et al. | 405/60 |
| 8,038,027 B2 | 10/2011 | Ohsawa et al. | |
| 8,096,438 B2 | 1/2012 | Schmalz et al. | |
| 8,113,376 B2 * | 2/2012 | Matsubara et al. | 220/304 |
| 8,240,292 B1 * | 8/2012 | Roche et al. | 123/516 |
| 8,551,231 B2 | 10/2013 | Tanaka | |
| 8,561,826 B2 | 10/2013 | Wang et al. | |
| 2003/0234254 A1 | 12/2003 | Grybush et al. | |
| 2006/0016436 A1 * | 1/2006 | Groom et al. | 123/520 |
| 2007/0108212 A1 * | 5/2007 | Nelson | 220/371 |
| 2007/0151628 A1 * | 7/2007 | Thompson et al. | 141/326 |
| 2011/0168715 A1 * | 7/2011 | Erdmann et al. | 220/373 |
| 2012/0097680 A1 | 4/2012 | Gulke et al. | |
| 2013/0341331 A1 | 12/2013 | Bork | |

FOREIGN PATENT DOCUMENTS

| | | |
|---|---|---|
| CN | 101289060 | 10/2008 |
| GB | 2376460 | 12/2002 |

OTHER PUBLICATIONS

Corresponding Chinese Office Action dated Jun. 18, 2014.
Corresponding Chinese Office Action dated Nov. 14, 2014.
Willingham, Charles B., "Separation of Hydrocarbons of High Molecular Weight by Adsorption on Silica Gel", Part of Journal of Research of the National Bureau of Standards, vol. 22, Mar. 1939, pp. 321-327. US.

* cited by examiner

CLOSURE DEVICE FOR CONTROLLING EVAPORATIVE EMISSIONS FROM A FUEL TANK

CROSS-REFERENCE TO RELATED PATENT APPLICATIONS

The present application claims the benefit of U.S. Provisional Patent Application Ser. No. 61/405,505, filed Oct. 21, 2010, the entirety of which is hereby incorporated by reference.

FIELD OF THE INVENTION

The present invention relates generally to the field of controlling evaporative emissions from a fuel tank, and specifically to an evaporative emissions fuel cap.

BACKGROUND OF THE INVENTION

Internal combustion engines are typically run by liquid fuel that is contained within a fuel tank. An air space exists above the surface of the liquid fuel within the fuel tank. Over time, this air space becomes filled with evaporative emissions (i.e., fuel vapor) from the liquid fuel and can be under pressure. It is desired that the amount of such evaporative emissions contained within the tank be minimized for multiple reasons, the primary reason of which is to minimize the emission of hydrocarbons into the atmosphere.

A typical fuel tank assembly generally comprises of a reservoir portion, a neck portion, and a fuel cap that seals the neck portion. The neck portion of the fuel tank is typically integrally formed as a single unit with the reservoir portion. When the level of the liquid fuel in the reservoir portion is low, the vapor region contains a large amount of fuel vapor under pressure. Consequently, when the fuel cap is detached from the neck portion, the fuel vapor is forced out of the fuel reservoir and into the outside air, causing air pollution.

One approach used by the industry to reduce these evaporative fuel emissions is to incorporate a filtration system into the fuel cap that vents the vapor region and adsorbs hydrocarbons from the vented fuel vapor prior to being released into the atmosphere. The hydrocarbon filtration is typically accomplished by venting the fuel vapor through a chamber within the fuel cap containing activated charcoal. The activated charcoal has a natural affinity for hydrocarbons when in direct communication with fuel vapor. Once the activated carbon becomes saturated with hydrocarbons it must be purged with fresh air to unload the carbon particles of these hydrocarbons. The purging of hydrocarbons with fresh air can be achieved using two methods: (1) an "active purging" method that uses a pumping source to draw fresh air through the carbon containing chamber; and (2) a "passive purging" method that uses naturally occurring conditions to create air flow through the carbon containing chamber. For example, passive purging can be achieved by the small vacuum that is inherently created within the fuel tank reservoir as the fuel level drops, thereby drawing fresh air from the atmosphere through the carbon containing chamber. Passive purging can also occur due to changes in temperature of the fuel and/or fuel vapor, even when the engine is not running.

Fuel caps utilizing a passive purge are known in the art and have become desirable due to their simplicity of manufacture and case of use. However, existing passive purge fuel caps suffer from a number of drawbacks, including: inadequate purging of the hydrocarbon adsorbing media; inadequate fuel vapor flow through the hydrocarbon adsorbing media; and a tendency to become contaminated by splashed liquid fuel from the reservoir. Thus, a need exists for an improved passive purge fuel cap.

SUMMARY OF THE INVENTION

The present invention is directed to a fuel cap for controlling evaporative emissions from a fuel tank.

In one aspect, the invention can be a closure device for controlling evaporative emissions from a fuel tank comprising: a housing defining an internal chamber containing a hydrocarbon adsorbing media; a stem extending from a floor of the internal chamber; a sheath disposed over the stem so as to form an annular gap between the sheath and the stem, the sheath having a closed top end; at least one aperture that forms a passageway between a bottom portion of the annular gap and the internal chamber; the stem comprising an inlet passageway extending from a fuel vapor inlet port to a top portion of the annular gap; and at least one outlet passageway extending from the internal chamber to an atmospheric air outlet port.

In another aspect, the invention can be a closure device for controlling evaporative emissions from a fuel tank comprising: a housing defining an internal chamber containing a hydrocarbon adsorbing media; a fuel vapor diffuser extending from a floor of the internal chamber and into the internal chamber, the fuel vapor diffuser comprising: (1) an inlet passageway extending from a fuel vapor inlet port to a plenum in a top portion of the fuel vapor diffuser; and (2) a downcomer passageway extending from the plenum to at least one aperture located at a bottom portion of the fuel vapor diffuser, the at least one aperture forming a passageway between the downcomer passageway and the internal chamber; and at least one outlet passageway extending from the internal chamber to an atmospheric air outlet port.

In yet another aspect, the invention can be a closure device for controlling evaporative emissions from a fuel tank comprising: a housing forming an internal chamber; a hydrocarbon adsorbing media in the internal chamber; a fuel vapor diffuser extending upward from the floor of the internal chamber and into the internal chamber, the fuel vapor diffuser comprising a fluid path between a fuel vapor inlet port to the internal chamber; at least one outlet passageway extending from the internal chamber to an atmospheric air outlet port; and a tether having a first end anchored within the fluid path, the first end of the tether being located at a height above a bottom of the internal chamber.

In still another aspect, the invention can be a closure device for controlling evaporative emissions from a fuel tank comprising: a housing having a longitudinal axis and defining an internal chamber; a first diffuser distributing fuel vapor from a fuel vapor inlet port into a lower zone of the internal chamber as a radial flow of fuel vapor; a second diffuser disposed in the internal chamber that separates the internal chamber into the lower zone and an upper zone, the second diffuser distributing fuel vapor from the lower zone into the upper zone as an axial flow of fuel vapor; and at least one outlet passageway extending from the upper zone of the internal chamber to an atmospheric air outlet port.

In an even further embodiment, the invention can be a system for controlling evaporative emissions of a fuel comprising: a fuel tank containing the fuel having a fuel tank opening; a closure device detachably coupled to the fuel tank that encloses the fuel tank opening, the closure device comprising: a housing having a longitudinal axis and defining an internal chamber; a first diffuser distributing fuel vapor from a fuel vapor inlet port into a lower zone of the internal chamber as a radial flow of fuel vapor; a second diffuser disposed in the internal chamber that separates the internal chamber into the lower zone and an upper zone, the second diffuser distributing fuel vapor from the lower zone into the upper zone as an axial flow of fuel vapor; and at least one outlet passageway extending from the upper zone of the internal chamber to an atmospheric air outlet port.

SUMMARY OF THE INVENTION

DETAILED DESCRIPTION OF THE DRAWINGS

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Preferred embodiments of the present invention will now be described herein with respect to one possible embodiment of a passive purge fuel cap. However, in other forms, the invention could be incorporated into active purge fuel caps, passive purge carbon canisters, and/or active purge carbon canisters.

Figure 1:
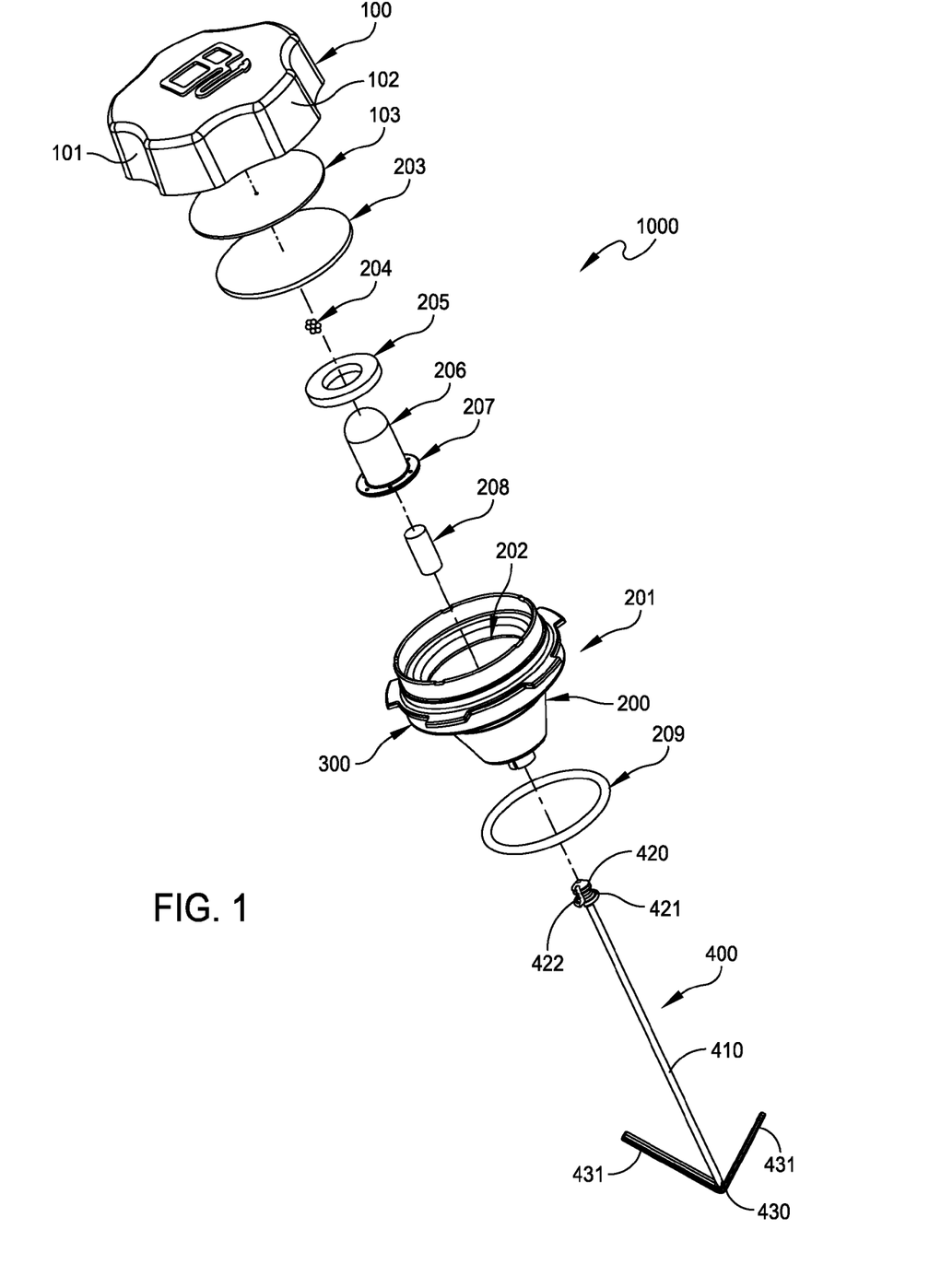
FIG. 1 is an exploded view a passive purge fuel cap according to one embodiment of the present invention.

Referring first to FIG. 1, a fuel cap 1000 according to one embodiment of the present invention is illustrated in an exploded state. The fuel cap 1000 is designed to be removably coupled to the neck of a fuel tank to prevent liquid fuel from spilling out or otherwise escaping from the reservoir of the fuel tank. While the fuel cap 1000 prevents liquid fuel from exiting the fuel tank reservoir via the neck, the fuel cap 1000 allows fuel vapor that gathers in the fuel vapor region of the reservoir above the liquid fuel to vent therethrough after being filtered therein by a hydrocarbon adsorbing media. The fuel cap 1000 controls evaporative emissions from a fuel tank in an improved manner. Moreover, the design of the fuel cap 1000 does not increase the manufacturing complexity and/or manufacturing cost, as compared to prior art fuel caps that are less effective at controlling evaporative emissions. While the exemplified embodiment of the fuel cap 1000 is illustrated and described below as a "passive purge" type fuel cap, those skilled in the art will appreciate that the inventive concepts, structures, and structural arrangements disclosed herein can be incorporated into "active purge" type fuel caps and, thus, are considered within the scope of the present invention in certain embodiments.

As discussed in detail below, the fuel cap 1000, in certain embodiments, can provide one or more of the following: (1) improved distribution of the fuel vapor throughout the hydrocarbon adsorbing media during a venting cycle; (2) improved distribution of the atmospheric air throughout the hydrocarbon adsorbing media during a purging cycle; (3) minimization and/or prevention of liquid fuel from splashing into the chamber containing the hydrocarbon adsorbing media; and/or (4) increased volume capacity for the chamber containing the hydrocarbon adsorbing media, thereby allowing a greater amount of the hydrocarbon adsorbing media to be used. While the aforementioned results may be achieved in certain embodiments of the invention, the invention is in no way limited to achieving these desired results and/or effects.

The fuel cap 1000 generally comprises a cap portion 100, a plug portion 200, a collar portion 300, and a tether 400. In the exemplified embodiment, the plug portion 200 and the collar portion 300 collectively define a housing 201 that forms an internal chamber 202 that contains a hydrocarbon adsorbing media 204. The housing 201, in one embodiment, is formed of a low permeation Acetal (POM) thermoplastic material. However, in other embodiments, the housing 201 can be made with other low permeation thermoplastics (PBT+PC, PA6, PA66, PA46, PPA, PPS), die cast metal (Aluminum & Zinc), or any other material that is sufficiently structurally rigid and inert with respect to the type of fuel to be used therewith.

In the illustrated embodiment, the collar portion 300 and plug portion 200 are integral with one another, thus resulting in the housing 201 being a unitary structure. However, in other embodiments, the collar portion 300 may be formed separately and subsequently coupled to the plug portion 200. In still other embodiments, the collar portion 300 may be integrally formed with and/or coupled to the cap portion 100.

The cap portion 100 couples to the collar portion 300 thereby forming a cover that substantially encloses a top end of the internal chamber 205. In one embodiment, the cap portion 100 snap fits to the collar portion 300. Of course, other connection techniques can be used, including without limitation, an interference fit, a threaded fit, a welded connection, the use of fasteners, and/or combinations thereof. In other embodiments, the cap portion 100 can be coupled to the plug portion 200 or other area of the housing 201 using any of the connection techniques described above. The cap portion 100 has a convolute peripheral surface 101 that forms a hand grip 102. The hand grip 102 provides a means by which a user can apply torque for the removal and installation of the fuel cap 1000 to the neck of the engine fuel tank. Of course, the hand grip 102 can take on a wide variety of structural embodiments, including protuberant and/or handle-like structures. In one embodiment, the cap portion 100 is formed of PA66 but, in other embodiments, could be made of other materials, including metals, composites, and other thermoplastics, such as PA6, PP, ABS, and could be fiber-tilled or un-filled material grades.

As will be described in greater detail below, the collar portion 300 receives a neck of a fuel tank when the fuel cap 1000 is installed to the engine fuel tank. The collar portion 300 removably couples the fuel cap 1000 to the neck of the engine fuel tank, thereby preventing liquid fuel from escaping the fuel tank in an undesirable manner. Such coupling can be accomplished by providing appropriate mating features on both the collar potion 300 and the fuel tank neck. For example, features can be added that accomplish a threaded fit, a snap fit, an interference fit, or any other type of mechanical coupling. When the fuel cap 1000 is coupled to the neck of the fuel tank, the plug portion 200 extends into the neck of the engine fuel tank. The fuel cap 1000 is detachably coupled to the fuel tank so as to enclose a fuel tank opening into the fuel tank, which can be located for example at the end of the neck or on wall of the fuel tank itself. The fuel tank opening, in certain embodiment, can be used to introduce fuel into the fuel tank itself. In other embodiments, the fuel tank opening can be provided in addition to the opening used to introduce fuel into the fuel tank.

The tether 400 generally comprises a cable portion 410, a fuel cap anchor 420 coupled to one end of the cable portion 410, and a fuel tank reservoir anchor 430 coupled to the other end of the cable portion 410. In the illustrated embodiment, the fuel tank reservoir anchor 430 comprises two elongate members 431 extending from the cable portion 410 to form a substantially V-shaped arrangement. The invention however is not so limited, and in alternate embodiments the fuel tank reservoir anchor 430 may comprise more than two elongated members 431. Further, in alternate embodiments the elongate members 431 may extend from the cable portion 410 in alternate arrangements and/or take on various shapes, such as, for example a substantially U-shaped arrangement, a substantially W-shaped arrangement, a substantially T-shaped arrangement, a truncated (or flattened out) V-shape, or combinations thereof.

In alternate embodiments, the tether 400 may take the form of a metal cable or chain to which a circular ring is coupled. In such embodiments, the circular ring has a diameter that is larger than the diameter of the fuel tank opening in an undeformed state that prevents the circular ring from being inadvertently dislodged from the fuel tank. It should be noted that the invention is not so limited, and in alternate embodiments the tether 400 may comprise any combination of the components recited herein.

The tether 400 prevents separation of the fuel cap 1000 from the engine fuel tank. The tether 400 is coupled to the fuel tank at one end by sliding the fuel tank reservoir anchor 430 through the fuel tank inlet port, through the neck, and into the fuel tank reservoir. During the insertion through the fuel tank inlet port and neck, the elongate members 431 bend inward, thereby allowing passage of the fuel reservoir anchor 430 into the fuel tank reservoir. Once inside of the fuel tank reservoir, the elongate members 431 expand back to their original shape and are wider than the neck, thereby preventing withdrawal from the fuel tank reservoir under typical loading. The fuel cap anchor 420 prevents separation from the main housing 201 by being anchored thereto, via a snap-fit or other connection. The fuel cap anchor end 420 comprises a plurality of spaced apart ribs 421 extending from an outer surface of the fuel cap anchor end 420. The fuel cap anchor end 420 also comprises an axial groove 422 formed in the outer surface of the fuel cap anchor end 420, the purpose of which will be described in greater detail below. In one embodiment, the tether 400 is formed of a thermoplastic, but could be made with a metal, wire, and or combinations thereof.

The fuel cap 1000 further comprises a plurality of additional components, including a closure plate 103, an upper particulate filter 203, a hydrocarbon adsorbing media 204, a lower particulate filter 205, a sheath 206, a diffuser plate 207, a liquid entrapment filter 208, and an O-ring seal 209.

Figure 2:
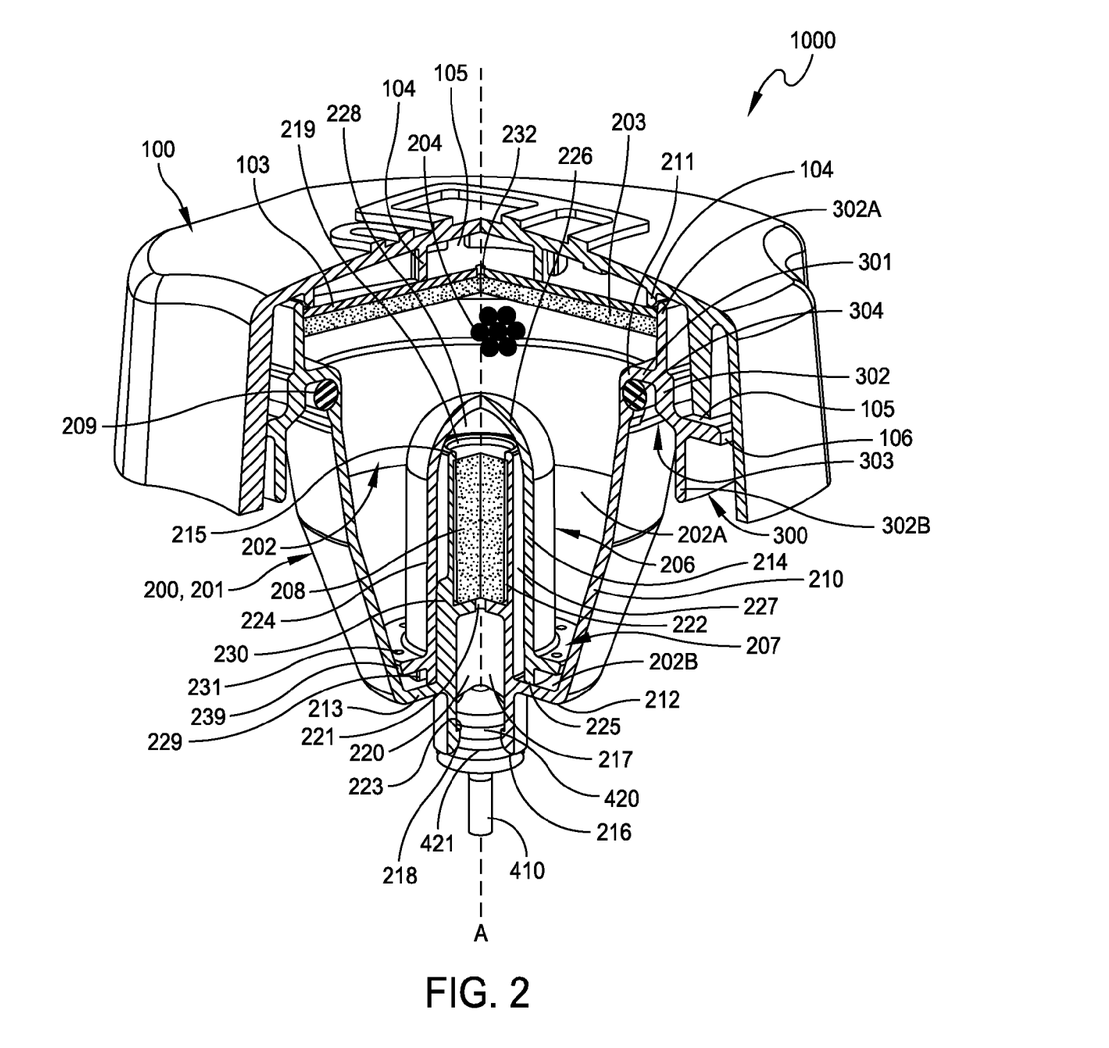
FIG. 2 is a top perspective view of the passive purge fuel cap of FIG. 1 wherein a quarter-section has been cutaway.
Figure 3:
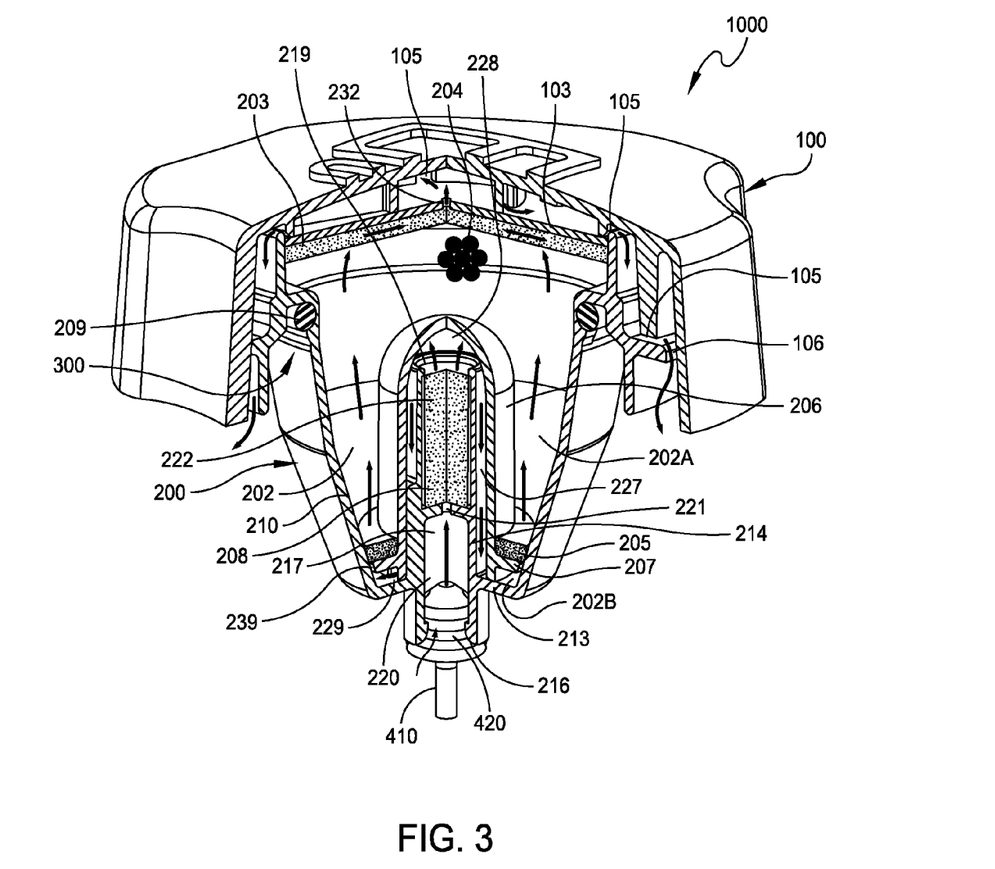
FIG. 3 is a top perspective view of the passive purge fuel cap of FIG. 1 wherein a quarter-section has been cutaway and the fluid flow path is schematically illustrated.

Referring now to FIGS. 1-3 concurrently, the fuel cap 1000, including the structural cooperation and function of its components, will be described in an assembled state. The fuel cap 1000 comprises a longitudinal axis A-A, which in the exemplified embodiment is also the central axis of the fuel cap 1000. The housing 201 comprises an outer wall 210 that circumferentially surrounds the longitudinal axis A-A and has a diameter that tapers from a top end 211 to a bottom end 212. A floor 213 extends from the bottom end 212 of the outer wall 210 radially inward toward the longitudinal axis A-A. The internal chamber 202 is formed within the housing 201. The floor 213 closes the bottom end of the internal chamber 202 while a combination of the closure plate 103 and the cap portion 100 closes the top end of the internal chamber 202.

Figure 4:
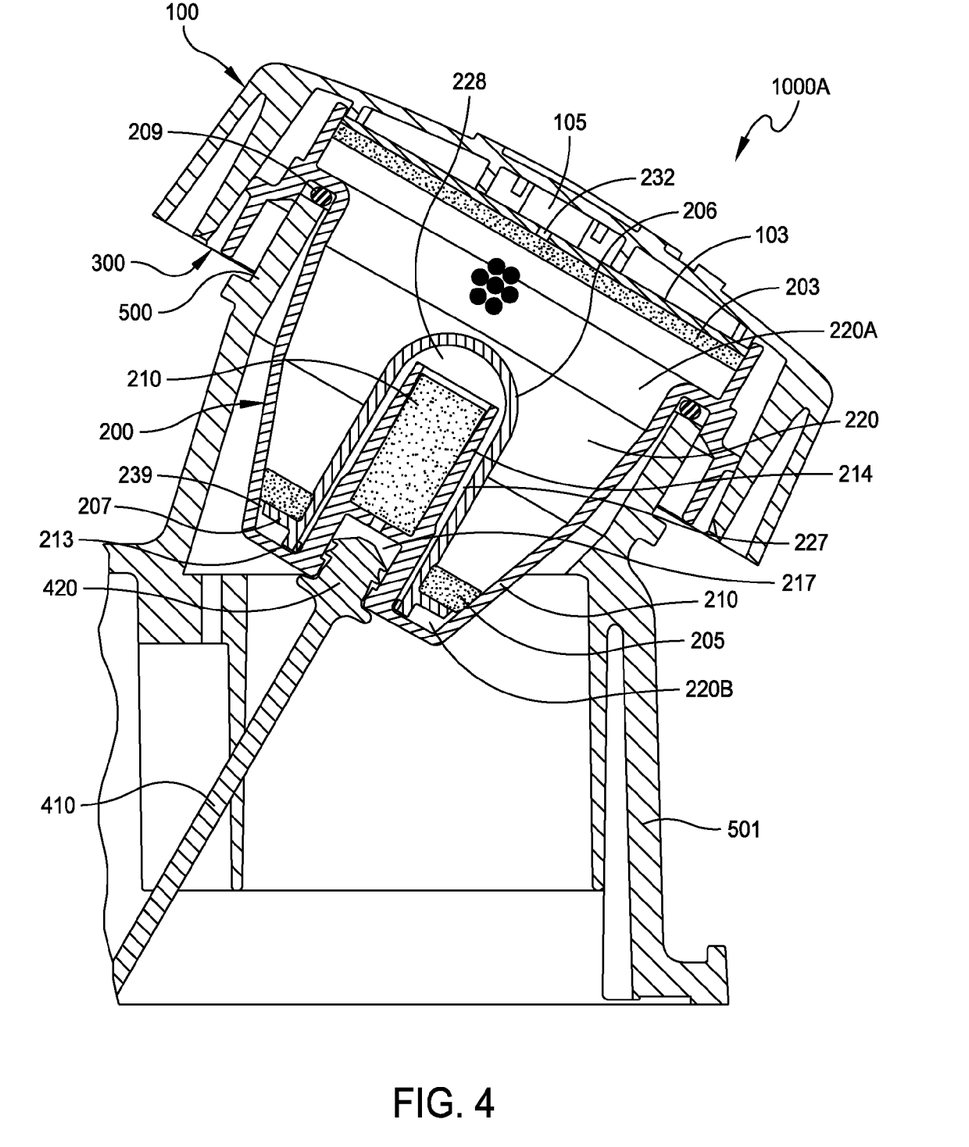
FIG. 4 is a cross-sectional schematic of a passive purge fuel cap according to a second embodiment of the present invention.

A stem 214 extends axially upward from a top surface of the floor 213 along the longitudinal axis A-A, terminating in a top surface 215. In the exemplified embodiment, the stem 214 also extends axially downward from a bottom surface of the floor 213, terminating in a bottom surface 216. However, in other embodiments, such as is shown in FIG. 4, the stem 214 may not extend axially downward from the bottom surface of the floor 213 but instead may terminate flush therewith. In such embodiments, the bottom surface 216 of the stem 214 will be in plane with the bottom surface of the floor 213.

In the exemplified embodiment, the stem 214 is integrally formed with the floor 213 and can be constructed of any of the materials discussed above for the housing 201. In other embodiments, the stem 214 may be a separate component that is fitted within a central opening formed in the floor 213. The stem 214 comprises an inlet passageway 217 formed therein that extends from a fuel vapor inlet port 218 in the bottom surface 216 of the stem 214 to an outlet 219 formed in the top surface 215 of the stem 214. The inlet passageway 217 is a linear passageway that extends coextensive with the longitudinal axis A-A. In other embodiments, however, the inlet passageway 217 may be non-linear and/or may not be coextensive with the longitudinal axis A-A.

The inlet passageway 217 comprises a control section for preventing liquid fuel from the fuel tank from passing fully through the inlet passageway 217 and a coupling section in which the fuel cap anchor 420 is disposed. In the exemplified embodiment, the coupling section is formed by a first longitudinal section 220 of the inlet passageway 217 while the control section is formed by the combination of a second longitudinal section 221 and a third longitudinal section 222 of the inlet passageway 217. The second longitudinal section 221 is disposed axially between the first and third longitudinal sections 220, 222. The first longitudinal section 220 has a first transverse cross-sectional area, the second longitudinal section 221 has a second transverse cross-sectional area, and the third longitudinal section 222 has a third transverse cross-sectional area.

In order to prevent the amount of liquid fuel that can pass through the inlet passageway 217 at any given time, the second transverse cross-sectional area is designed to be less than the first and third transverse cross-sectional areas, thereby acting as a liquid flow constrictor. Furthermore, the liquid entrapment filter 208 is disposed within the third longitudinal section 222 of the inlet passageway 217, thereby further preventing liquid fuel from passing through the inlet passageway 217 and into the internal chamber 202. The liquid entrapment filter 208 traps liquid fuel therein but allows fuel vapor to flow therethrough. In one embodiment, the liquid entrapment filter 208 is a body of fuel resistant polyurethane porous foam having a high density of small pores. In other embodiments, the liquid entrapment filter 208 could be made with other materials, including without limitation other types of foam (polyester, polyether) or non-corrosive, non-oriented, fine metal wire packing (stainless steel, nickel, brass).

The liquid entrapment filter 208 and the constricted second longitudinal section 221 act in concerted manner to effectively prevent any liquid fuel from reaching the internal chamber 202 during splashing and/or overfilling. Of course, in certain embodiments, only one of the liquid entrapment filter 208 or the constricted second longitudinal section 221 may be incorporated into the inlet passageway 217.

The coupling section is formed by the first longitudinal section 220 of the inlet passageway 217. The fuel tank anchor 420 of the tether 400 is anchored and disposed within the first longitudinal section 220 of the inlet passageway 217, thereby coupling the tether to the housing 201. The fuel tank anchor 420 comprises a plurality of spaced-apart ribs 421 protruding from the outer surface of the fuel tank anchor 420. The ribs 421 project form the outer surface of the fuel tank anchor 420 in a radially outward and downwardly inclined manner with respect to the longitudinal axis A-A. When disposed in the first longitudinal section 220 of the inlet passageway 217, the ribs 421 prohibit the fuel tank anchor 420 from being removed therefrom by engaging a retaining flange 223 that extends radially inward from an inner surface of the first longitudinal section 220 at or near the fuel vapor inlet port 216. However, due to their downwardly inclined nature, the ribs 421 will slide past the retaining flange 223 during insertion.

In order to ensure that fuel vapor can flow into the fuel vapor inlet port 216, the fit between the fuel tank anchor 420 and the inner surface of the stem 214 that forms the first longitudinal section 220 of the inlet passageway 217 is not hermetic. Furthermore, an axially extending groove 422 (FIG. 1) is provided in the outer surface of the fuel tank anchor 420 to further effectuate fuel vapor flow into the first longitudinal section 220 of the inlet passageway 217 via the fuel vapor inlet port 216.

A sheath (or hood) 206 is positioned over and coupled to the stem 214. As explained in greater detail below, the sheath 206 and the stem 214 collectively form a fuel vapor diffuser. In the exemplified embodiment, the sheath 206 is coupled to the stem 214 by an interference fit effectuated by contact between a plurality of vertical flanges 230 extending from the outer surface of the stem 214 and the inner surface of the sheath 206. The vertical flanges 230 are arranged in a circumferentially equi-spaced manner about the longitudinal axis A-A. In one embodiment, a total of three flanges 230 are used. Of course, the invention is not so limited and any number of flanges or other protuberant structures could be used. Moreover, in other embodiments, the sheath 206 may be coupled to the stem 214, or otherwise secured in a stable orientation and positioned within the internal chamber 202, through other types of connections, including without limitation a snap-fit connection, a threaded connection, a welded connection, or integral formation.

The sheath 206 comprises a cylindrical wall 224 having an open bottom end 225 and a closed top end 226. In the exemplified embodiment, the closed top end 226 is a dome-shaped structure that is integrally formed with the cylindrical wall 224. In other embodiments, the closed top end 226 can take on other shapes and may not be integrally formed with the cylindrical wall 224. The sheath 206 can be constructed of the same materials as the housing 201 described above.

The sheath 206 is disposed over the stem 214 so that the cylindrical wall circumferentially surrounds the stem 214 along the longitudinal axis A-A. As a result, an annular gap 227 is formed between an inner surface of the cylindrical wall 224 of the sheath 206 and the outer surface of the stem 214. A plenum 228 is also formed between an inner surface of the closed top end 226 of the sheath 206 and the top surface 215 of the stem 214. The inlet passageway 217 is in spatial communication with the plenum 228. The plenum 228 is in spatial communication with the annular gap 227. As discussed in greater detail below, the annular gap 227 acts as a downcomer passageway for fuel vapor passing through the fuel cap 1000 and being vented from the fuel tank reservoir.

The sheath 206 further comprises a plurality of apertures 229 that form passageways between a bottom portion of the annular gap 227 and the internal chamber 202. In one embodiment, the apertures 229 are arranged in a circumferentially equi-spaced manner on the cylindrical wall 224 of the sheath 206 about the longitudinal axis A-A to effectuate a 360° radial distribution of incoming fuel vapor from the annular gap 227 to the internal chamber 202 (and more specifically to the lower zone 202B as discussed below). As a result, the cylindrical wall 224 of the sheath 206 acts as a first diffuser that evenly distributes a radial flow of fuel vapor circumferentially about the longitudinal axis A-A. Thought of another way, the radial flow of fuel vapor is distributed about the longitudinal axis in a circumferentially symmetric manner by the first diffuser. Conceptually, in certain embodiments, the combination of the stem 214 and the sheath 206 can be considered the first diffuser. In one particular embodiment, a total of five apertures 229 are provided that are located about 72° apart. Of course, more or less apertures 229 may be included as desired. The number and diameter of the apertures 229 may be specific to the carbon mass efficiency requirements.

In the exemplified embodiment, the apertures 229 are formed by notches created in the bottom edge of the cylindrical wall 224 of the sheath 206. However, in other embodiments, the apertures 229 may be closed-geometry holes formed in the cylindrical wall 224 of the sheath 206. In still other embodiments, the apertures 229 may be formed as tunnels or grooves formed in the floor 213 of the housing 201. This small space for the distribution of vapor/air between the diffuser and the internal base of the carbon chamber housing is accomplished with a notched ring about the bottom surface of the diffuser. The apertures 229 are strategically placed (radial placement) to optimize vapor saturation within the carbon bed. In still another embodiment, the aperture 229 can be a single continuous annular gap that circumferentially surrounds the longitudinal axis A-A. In one such embodiment, the aperture can be formed between a bottom edge of the cylindrical wall 224 of the sheath 226 and the top surface of the floor 213 of the housing 201.

A diffuser plate 207 is located within the internal chamber 202 of the housing 201. The diffuser plate 207 can be formed of any of the materials described above for the housing 201. In the exemplified embodiment, the diffuser plate 207 is integrally formed as part of the sheath 206. In other embodiments, the diffuser plate 207 may be a separate structure that is disposed in the internal chamber subsequent or prior to the sheath 206.

The diffuser plate 207 is transversely oriented so as to separate the internal chamber 202 into an upper zone 202A and a lower zone 202B. The diffuser plate 207 comprises a plurality of diffuser holes 231 that form axial passageways between the lower and upper zones 202B, 202A of the internal chamber 202. The diffuser holes 207 are arranged in a circumferentially equi-spaced manner on the diffuser plate 207 about the longitudinal axis A-A to effectuate a 360° axial distribution of incoming fuel vapor from the lower zone 202B to the upper zone 202A (which contains the hydrocarbon adsorbing media). As a result, the diffuser plate 207 acts as a second diffuser that evenly distributes an axial flow of fuel vapor circumferentially about the longitudinal axis A-A. Thought of another way, the axial flow of fuel vapor is distributed about the longitudinal axis in a circumferentially symmetric manner by the second diffuser. In one particular embodiment, a total of six diffuser holes 231 are provided that are located about 60° apart. Of course, more or less diffuser holes 231 may be included as desired. The number and diameter of the diffuser holes 231 may be specific to the carbon mass efficiency requirements.

The diffuser plate 207 extends radially from the outer surface of the sheath 206 to the inner surface of the outer wall 210 of the housing 201. In certain embodiments, the diffuser plate 207 will be in contact with both the outer surface of the sheath 206 and to the inner surface of the outer wall 210 of the housing 201 so that the only fluid passageways between the lower and upper zones 202B, 202A is through the diffuser holes 231. In the exemplified embodiment, a small annular gap 239 exists between the diffuser plate 207 and the inner surface of the outer wall 210 of the housing 201 to further effectuate a diffused flow of fuel vapor from the lower zone 202B to the upper zone 202A.

The apertures 229 are located on the cylindrical wall 224 of the sheath 206 so that the bottom portion of the annular gap 227 is in spatial communication with the lower zone 202B of the internal chamber 202. As a result, fuel vapor from the annular space 227 is radially diffused into the lower zone 202B via the apertures 229. Once in the lower zone 202B, the fuel vapor is then axially diffused into the upper zone 202A and into contact with the hydrocarbon adorning media 204.

The upper zone 202A contains a predetermined amount of the hydrocarbon absorbing media while the lower zone 202B remains empty. In one embodiment, a predetermined amount of activated carbon particles fills the majority of the upper zone 202A of the internal chamber 202. When fuel vapor enters the upper zone 202A, hydrocarbon vapors communicate and imbed themselves within the pores of the hydrocarbon adsorbing media 204 as the fuel vapor passes through the mass of particles. Activated carbon performance (the ability to load and unload hydrocarbon molecules) is directly related to processing cost. The greater the ability of the fuel cap 1000 to diffuse vapor and air through the carbon mass will effectively optimize the carbon mass requirement and therefore cost. By using both a radial flow diffuser (cylindrical wall 224 with apertures 229) and an axial flow diffuser (diffuser plate 207 with diffuser holes 231), saturation of the entirety of the carbon bed is optimized. Furthermore, while the exemplified embodiment of the present invention utilizes a radial flow diffuser (cylindrical wall 224 with apertures 229) that creates a radially outward flow, in other embodiments of the invention a radial flow diffuser could be designed to create a radially inward flow from, for example, the outer wall 210.

In order to prevent the hydrocarbon adsorbing media (or particulate matter therefrom) from entering into the lower zone 202B (or clogging the diffuser holes 231), a lower particulate filter 205 (FIG. 3) is provided atop the diffuser plate 207. The hydrocarbon adsorbing media 204, in turn, is positioned atop the lower particulate filter 205. In the exemplified embodiment, the lower particulate filter 205 is an annular ring that circumferentially surrounds the sheath 206 and sits atop the diffuser plate 207. The lower particulate filter 205 can be made from the same materials as the liquid entrapment filter 208 discussed above. In addition to preventing the diffuser holes 231 holes from becoming clogged, the lower particulate filter 205 provides an area for the vapor to further diffuse outward as it passes therethrough and filters through the hydrocarbon adsorbing media 204.

An upper particulate filter 203 is also provided in the upper zone 202A of the internal chamber and sits atop the hydrocarbon adsorbing media 204. The upper particulate filter 203 may also be formed of the same material as the liquid entrapment filter 208 discussed above. The upper particulate filter 203 allows filtered fuel vapor that exits the bed of hydrocarbon adsorbing media to diffuse radially inward toward a central hole 232 of the closure plate 103 (discussed below). The upper particulate filter 203 also allows atmospheric (fresh air) to diffuse into the bed of hydrocarbon adsorbing media 204 during a purge cycle. Another function of the upper particulate filter 203, in conjunction with the lower particulate filter 205, is to provide a means to absorb shock imparted by the bed of hydrocarbon adsorbing material 204 when the engine is in use. Shock absorption is desirable because the hydrocarbon adsorbing media 204, which in one embodiment is carbon particles, can be brittle and can break apart under impact and become powdered. The effectiveness of the carbon will diminish if the particle size becomes too small.

Above the upper particulate filter 203 resides the closure plate 103. The closure plate 103 is a thin plastic disk or cap with a central hole 232. The central hole 232 forms a passageway for allowing filtered fuel vapor to exit the internal chamber 202 during the venting cycle, and for allowing atmospheric fresh air to enter the internal chamber 202 during the purge cycle. By centralizing the central hole 232 on the longitudinal axis A-A, excess fuel vapor is forced to travel through the bed of hydrocarbon adsorbing media 204, thereby building an expanding plume within the internal chamber 202 to provide every chance of absorption by the carbon particles.

The closure plate 103 is also used to uniformly apply a load which is imparted by the cover portion 100 as it snap fits to the collar portion 300 of the housing 201. This pre-load effect ensures the hydrocarbon adsorbing media 204 is closely packed within the internal chamber 204 to reduce carbon particle movement and, thus, collision and compaction of particles into powder. In one embodiment, the closure plate 103 is made of Acetal (POM) but could be made with other low permeation materials, such as the ones discussed above with respect to the housing 201.

As mentioned above, the cap portion 100 snap fits to the collar portion 300 to substantially enclose internal chamber 202 and imparts a load force onto the closure plate 103 by means of raised ribs 104 with a pre-determined interference. The collar portion 300 comprises an annular engagement flange 301 extending radially outward from the top end 203 of the outer wall 210. An annular skirt 302 is coupled to the annular engagement flange 301. An upper portion 302A of the annular skirt 302 extends upward from the annular engagement flange 301 while a lower portion 302B of the annular skirt 302 extends downward from the annular engagement flange 301. An annular groove 303 is formed between the lower portion 302B of the annular skirt 302, the outer wall 210, and the annular engagement flange 301. The annular groove 303 has an open bottom end so that the neck of the fuel tank can be inserted into the annular groove 303 when the fuel cap 1000 is coupled to the fuel tank. The O-ring seal 209 is positioned within the annular groove 303. The O-ring seal 209 is formed of a fuel resistant material, such as a rubber. In one embodiment, the O-ring seal can be formed from Teflon coated Nitrile, but could be made with other rubber material compounds with similar properties, such as fluoro-elastomers and ESM blends.

The O-ring seal nests within a hemispherical channel 304 formed in the outer surface of the outer wall 210. The channel 304 retains the O-ring seal 209. A pair of lugs (rectangular in cross-section) is also provided near the periphery of the channel 304. The lugs are engineered with specific geometric offsets and lead-in features to facilitate an exact clamping load between the fuel tank neck connecting thread and the fuel cap 1000. The lead-in feature of the lug acts to ramp up the interference with a smooth twisting motion of the cap portion 1000. The fuel cap 1000 will then come to rest on the latch with a positive tactile response. In other embodiments of the fuel cap 1000, the carbon chamber housing could be design to have a screw type thread connection.

The cap portion 100 comprises a multitude of pocket features which mate with a similar number of male features at the periphery of the collar portion 300 which, when engaged, allow driving force to effectuate the removal and installation of the fuel cap 1000 from the neck of the fuel tank. The exact structural configuration and assembly of the cap portion 100 to the collar portion 300 is not important to the present invention and is known in the art.

A plurality of apertures, cutouts, and holes 105 exist within the cap portion 100, within the collar portion 300, and/or between the cap portion 100 and collar portion 300 that form a fluid passageway labyrinth that extends from the central opening 232 in the closure plate 103 to the external ambient air atmosphere. Thus, an outlet passageway is formed that extends from the top of the internal chamber 202 to the atmospheric air outlet port 106, which includes the central opening 232 and the aforementioned passageway labyrinth. The atmospheric air outlet port 106 is located behind the lower, inside skirt wall of the cap portion 100. This location provides protection from dirt & debris, which could block atmospheric air outlet port 106 and potentially affect engine running performance. The exact configuration of the passageway labyrinth and the positioning of the atmospheric air outlet port 106 on the fuel cap 1000 are in now way limiting of the present invention. The outlet passageway allows filtered fuel vapor to pass from the internal chamber 202 and into the ambient air atmosphere during a venting stage and allows ambient air to be drawn into the fuel cap and into the internal chamber 202 during a purging stage.

Referring now solely to FIG. 3, the venting and purging operation of the fuel cap 1000 will be described. The fuel cap 1000 is first coupled to the neck of the fuel tank so that a hermetic seal is formed between the neck and the collar portion 300 of the fuel cap through compression of the O-ring seal 209 therebetween (see FIG. 4). Once coupled to the fuel tank, fuel vapor builds up in the vapor region of the fuel tank reservoir, and flows into the inlet passageway 217 of the fuel cap 1000 via the fuel vapor inlet port 216. The fuel vapor then travels through the longitudinal sections 220-222 (and the liquid entrapment filter 208) of the inlet passageway 217. The fuel vapor then exits the inlet passageway 217 via the outlet 219 and into the plenum 228. The fuel vapor within the plenum 228 is then dispersed into the annular gap 227, wherein the fuel travels downward in the annular gap 227. The downward traveling fuel vapor reaches the bottom of the annular gap 227 wherein fuel vapor is diffused 360° circumferentially and radially outward via the apertures 229 into the lower zone 220B. Once in the lower zone 220B, the fuel vapor is diffused 360° circumferentially and axially upward via the diffuser holes 231 and the annular gap 239, through the lower particulate filter 205, and into the upper zone 202A which is filled with the hydrocarbon adsorbing media 204. Due to the aforementioned diffusion, the fuel vapor is effectively dispersed throughout the volume of the upper zone 202A of the internal chamber 202 and, thus, effectively throughout the hydrocarbon adsorbing media 204. Any small amounts of fuel vapor (or non hydrocarbon gases that may be within the fuel vapor) that are not captured by the hydrocarbon adsorbing media 204 then pass through the upper particulate filter 203, and enters the outlet passage via the central opening 232 in the closure plate 103. The extraneous fuel vapor (or other gases) then pass through the outlet passageway and exit the fuel cap 1000 via the ambient air outlet port 106.

As the liquid fuel level lowers in the fuel tank reservoir during operation of the engine, a vacuum is created within the fuel tank reservoir that creates a negative pressure force at the fuel vapor inlet port 216. As a result of this negative pressure, ambient air is drawn into the fuel cap 1000 via the ambient air outlet port 106. The ambient air then follows the fluid flow path described above but in the opposite direction. As the ambient air passes through the hydrocarbon adsorbing media 204, it purges the hydrocarbons collected in the hydrocarbon adsorbing media 204 and carries them back to the fuel tank reservoir.

Purging of the hydrocarbons collected in the hydrocarbon adsorbing media 204 can also be achieved due to changes in temperature of the fuel and/or fuel vapor. For example, as the fuel temperature decreases, the partial pressure of the fuel vapor in the tank headspace also decreases. As a result, air is drawn into the fuel cap 1000 via the ambient air outlet port 106 to compensate for decreasing partial pressure of the fuel vapor. The ambient air then follows the fluid flow path described above but in the opposite direction. As the ambient air passes through the hydrocarbon adsorbing media 204, it purges the hydrocarbons collected in the hydrocarbon adsorbing media 204 and carries them back to the fuel tank reservoir. In this manner, the fuel cap 1000 is able to adsorb and purge hydrocarbons due to temperature fluctuations, even when the engine is not operating.

Referring now to FIG. 4, a fuel cap 1000A is illustrated according to a second embodiment of the present invention coupled to the neck 500 of a fuel tank reservoir 501. The fuel cap 1000A is identical to the fuel cap 1000 except that the stem 214 does not protrude from the bottom surface of the floor 213. Rather, the bottom surface of the stem 214 of fuel cap 1000A is flush with the bottom surface of the floor 213. Thus, in this embodiment, the fuel cap anchor 420 of the tether 400, which is anchored and disposed within the inlet passageway 416, is located at an axial position above the top surface of the floor 213 and, thus, axially even with a bottom portion of the internal chamber 202.

While a number of embodiments of the current invention have been described and illustrated in detail, various alternatives and modifications will become readily apparent to those skilled in the art without departing from the spirit and scope of the invention. As various changes could be made in the above methods, compositions and structures without departing from the scope of the invention, it is intended that all matter contained in this application, including all mechanisms and/or modes of interaction described above, shall be interpreted as illustrative only and not limiting in any way the scope of the appended claims.

What is claimed is:

1. A closure device for controlling evaporative emissions from a fuel tank comprising:
   a housing having an axis and defining an internal chamber containing a hydrocarbon adsorbing media;

a stem extending from a floor of the internal chamber along the axis, a first portion of the stem residing between the floor and a roof of the internal chamber, the first portion comprising a majority of an axial length of the stem;

a sheath disposed over the first portion of the stem so as to form an annular gap between the sheath and the stem, the sheath having a closed top end that is spaced from a roof of the internal chamber;

at least one aperture that forms a passageway between a bottom portion of the annular gap and the internal chamber;

the stem comprising an inlet passageway extending from a fuel vapor inlet port to a top portion of the annular gap; and at least one outlet passageway extending from the internal chamber to an atmospheric air outlet port.

2. The closure device according to claim 1 wherein the inlet passageway comprises a control section for preventing liquid fuel from the fuel tank from passing through the inlet passageway and a coupling section in which a first end of a tether is anchored.

3. The closure device according to claim 1 further comprising:

the stem terminating in a top surface located at a first axial height from the floor, the inlet passageway extending from the vapor inlet port and terminating in an opening in the top surface of the stem, a plenum located between the top surface of the stem and the closed top end of the sheath that fluidly couples the inlet passageway to the top portion of the annular gap; and the at least one aperture having a top located at a second axial height from the floor; and wherein the first axial height is greater than the second axial height.

4. The closure device according to claim 3 further comprising:

a diffuser plate positioned within the internal chamber that separates the internal chamber into an upper zone and a lower zone, the diffuser plate comprising at least one diffuser hole forming a passageway between the upper and lower zones, the diffuser plate located a third axial height from the floor, the first axial height being greater than the third axial height.

5. The closure device according to claim 1 further comprising:

a diffuser plate positioned within the internal chamber that separates the internal chamber into an upper zone and a lower zone, the diffuser plate comprising at least one diffuser hole forming a passageway between the upper and lower zones;

a particle filter disposed in the upper zone atop the diffuser plate;

the at least one aperture forming a passageway between the bottom portion of the annular gap and the lower zone, the hydrocarbon adsorbing media disposed in the upper zone;

the inlet passageway comprising a control section for preventing liquid fuel from the fuel tank from passing through the inlet passageway and a coupling section in which a first end of a tether is anchored; and the fuel vapor inlet port being located on a bottom surface of the stem, the inlet passageway extending from the vapor inlet port and terminating in an opening on a top surface of the stem.

6. A closure device for controlling evaporative emissions from a fuel tank comprising:

a housing defining an internal chamber containing a hydrocarbon adsorbing media;

a stem extending from a floor of the internal chamber;

a sheath disposed over the stem so as to form an annular gap between the sheath and the stem, the sheath having a closed top end;

at least one aperture that forms a passageway between a bottom portion of the annular gap and the internal chamber;

the stem comprising an inlet passageway extending from a fuel vapor inlet port to a top portion of the annular gap;

at least one outlet passageway extending from the internal chamber to an atmospheric air outlet port; and wherein the inlet passageway comprises a first longitudinal section having a first transverse cross-sectional area, a third longitudinal section having a third transverse cross-sectional area, and a second section disposed between the first and third longitudinal sections and having a second transverse cross-sectional area that is less than the first and third transverse cross-sectional areas.

7. The closure device according to claim 6 further comprising a tether having a first end anchored within the first longitudinal section of the inlet passageway and a liquid entrapment filter disposed in the third longitudinal section.

8. A closure device for controlling evaporative emissions from a fuel tank comprising:

a housing defining an internal chamber containing a hydrocarbon adsorbing media;

a stem extending from a floor of the internal chamber;

a sheath disposed over the stem so as to form an annular gap between the sheath and the stem, the sheath having a closed top end;

at least one aperture that forms a passageway between a bottom portion of the annular gap and the internal chamber;

the stem comprising an inlet passageway extending from a fuel vapor inlet port to a top portion of the annular gap;

at least one outlet passageway extending from the internal chamber to an atmospheric air outlet port;

a diffuser plate positioned within the internal chamber that separates the internal chamber into an upper zone and a lower zone, the hydrocarbon adsorbing media disposed within the upper zone;

a particle filter disposed in the upper zone atop the diffuser plate;

the at least one aperture forming a passageway between the bottom portion of the annular gap and the lower zone; and the at least one outlet passageway extending from the upper zone to the atmospheric air outlet port.

9. The closure device according to claim 8 wherein the diffuser plate is integral with the sheath and comprises a plurality of diffuser holes forming passageways between the lower zone and the upper zone.

10. A closure device for controlling evaporative emissions from a fuel tank comprising:

a housing defining an internal chamber containing a hydrocarbon adsorbing media;

a fuel vapor diffuser extending from a floor of the internal chamber and into the internal chamber, the fuel vapor diffuser comprising: (1) an inlet passageway extending from a fuel vapor inlet port to a plenum in a top portion of the fuel vapor diffuser; and (2) a downcomer passageway extending from the plenum to at least one aperture located at a bottom portion of the fuel vapor diffuser, the at least one aperture forming a passageway between the downcomer passageway and the internal chamber;

at least one outlet passageway extending from the internal chamber to an atmospheric air outlet port; and wherein the inlet passageway comprises a liquid entrapment filter for preventing liquid fuel from the fuel tank from passing through the inlet passageway;

wherein the fuel vapor diffuser comprises:
a stem comprising the inlet passageway; and
the plenum formed between a top surface of the stem and a closed top end of a sheath, and the downcomer passageway formed between the sheath and the stem; and wherein the housing comprises an axis, a first portion of the stem residing between a floor of the internal chamber and a roof of the internal chamber, the first portion comprising a majority of an axial length of the stem; the top surface of the stem located at a first axial height from the floor, the inlet passageway extending from the vapor inlet port and terminating in an opening in the top surface of the stem; the at least one aperture having a top located at a second axial height from the floor; and wherein the first axial height is greater than the second axial height.

11. The closure device according to claim 10 further comprising a tether having a first end anchored within the inlet passageway, the first end of the tether being located at a height above a top surface of the floor of the internal chamber.

12. A closure device for controlling evaporative emissions from a fuel tank comprising:
a housing defining an internal chamber containing a hydrocarbon adsorbing media;
a fuel vapor diffuser extending from a floor of the internal chamber and into the internal chamber, the fuel vapor diffuser comprising: (1) an inlet passageway extending from a fuel vapor inlet port to a plenum in a top portion of the fuel vapor diffuser; and (2) a downcomer passageway extending from the plenum to at least one aperture located at a bottom portion of the fuel vapor diffuser, the at least one aperture forming a passageway between the downcomer passageway and the internal chamber;
at least one outlet passageway extending from the internal chamber to an atmospheric air outlet port; and
a diffuser plate positioned within the internal chamber that separates the internal chamber into an upper zone and a lower zone;
a particle filter disposed in the upper zone atop the diffuser plate; and
the hydrocarbon adsorbing media disposed in the upper zone above the particle filter.

13. The closure device according to claim 12 wherein the at least one aperture forms a passageway between the downcomer passageway and the lower zone.

14. A closure device for controlling evaporative emissions from a fuel tank comprising:
a housing having a longitudinal axis and defining an internal chamber;
a first diffuser distributing fuel vapor from a fuel vapor inlet port into a lower zone of the internal chamber as a radial flow of the fuel vapor, the first diffuser comprising a first passageway transporting the fuel vapor in a first axial direction and a second passageway receiving the fuel vapor from the first passageway and transporting the fuel vapor in a second axial direction, the second axial direction being substantially opposite the first axial direction;
a second diffuser disposed in the internal chamber that separates the internal chamber into the lower zone and an upper zone, the second diffuser distributing the fuel vapor from the lower zone into the upper zone as an axial flow of fuel vapor;
at least one outlet passageway extending from the upper zone of the internal chamber to an atmospheric air outlet port, the at least one outlet passageway discharging the fuel vapor into an external atmosphere via the atmospheric air outlet port in a third axial direction, the third axial direction being substantially opposite the first axial direction; and
wherein the housing comprises an axis, the first passageway extending from the fuel vapor inlet port to an opening, the opening located at a first axial height above a floor of the internal chamber, the second diffuser located a second axial height from the floor of the internal chamber, the first axial height being greater than the second axial height.

15. The closure device of claim 14 further comprising:
a closure plate coupled to the housing to form a roof of the internal chamber, the closure plate comprising a hole forming a passageway for allowing the fuel vapor to exit the internal chamber;
a cap portion coupled to the housing and overlying the hole in the closure plate;
wherein the at least one outlet passageway is a tortuous pathway extending from the hole in the closure plate to the atmospheric air outlet port.

16. The closure device according to claim 14 wherein the fuel vapor is distributed from the lower zone into the upper zone via an annular gap formed between an edge of the second diffuser and an inner surface of the housing.

17. The closure device according to claim 14 wherein the fuel vapor is distributed from the lower zone into the upper zone via a plurality of diffuser holes in the second diffuser.

* * * * *